(12) United States Patent
Son (10) Patent No.: US 7,822,400 B1
(45) Date of Patent: Oct. 26, 2010

(54) APPARATUS AND METHOD FOR SUPPRESION OF TDMA NOISE IN A STEREO HEADPHONE

(75) Inventor: Hwang Soo Son, Cupertino, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 545 days.

(21) Appl. No.: 11/924,509

(22) Filed: Oct. 25, 2007

(51) Int. Cl.
*H04B 1/10* (2006.01)
*H04R 1/10* (2006.01)

(52) U.S. Cl. .................. 455/296; 381/74; 381/309; 381/71.1

(58) Field of Classification Search .............. 455/268, 455/296; 381/72, 74, 71.1, 71.6, 71.8, 71.7, 381/309
See application file for complete search history.

(56) References Cited

U.S. PATENT DOCUMENTS

| | | | |
|---|---|---|---|
| 6,278,786 B1* | 8/2001 | McIntosh | 381/71.6 |
| 7,065,219 B1* | 6/2006 | Abe et al. | 381/74 |
| 2001/0046304 A1* | 11/2001 | Rast | 381/74 |
| 2006/0013410 A1* | 1/2006 | Wurtz | 381/74 |
| 2009/0225999 A1* | 9/2009 | Lee | 381/74 |

OTHER PUBLICATIONS

LM4949 Steroe Class D Audio Subsystem with OCL Headphone Amplifier, National Semiconductor Corporation, Jan. 2007, 42 pgs.
LM4946, Output Capacitor-Less Audio Subsystem with programmable National 3D, National Semiconductor Corporation, Jun. 2007, 34 pgs.
LM4937 Audio Subsystem with OCL Stereo Headphone Output and RF Suppression, National Semiconductor Corporation, Aug. 2007, 42 pgs.
LM4947 Mono Class D and Stereo Audio Subsystem with OCL Headphone Amplifier and National 3D, National Semiconductor Corporation, Nov. 9, 2007, 34 pgs.

* cited by examiner

*Primary Examiner*—Blane J Jackson
(74) *Attorney, Agent, or Firm*—Frommer Lawrence & Haug LLP; Matthew M. Gaffney (57) ABSTRACT

A circuit for TDMA noise reduction is provided, which may be used in a mobile phone. The circuit includes a first audio amplifier, a second audio amplifier, and a switch. The circuit is attachable to a stereo headphone with two speakers, each speaker having two inputs. The first speaker has one input that is coupled to one input of the second speaker. The other input of each speaker is coupled to a corresponding audio amplifier. During a talk mode for the mobile phone, the common input of the two speakers is left floating. In this mode, the TDMA noise is substantially cancelled, and the sound is differential monophonic. When the mobile phone is not in a talk mode, the common input of the speakers is driven to Vdd/2 or ground, so that the sound is stereophonic.

16 Claims, 5 Drawing Sheets

APPARATUS AND METHOD FOR SUPPRESION OF TDMA NOISE IN A STEREO HEADPHONE

FIELD OF THE INVENTION

The invention is related to audio amplifiers, and in particular but not exclusively, to a method and circuit for an audio amplifier that having an operating mode in which an internal switch is opened to provide less Time Division Multiple Access (TDMA) noise.

BACKGROUND OF THE INVENTION

An audio amplifier is a power amplifier that may be used to amplify low-power audio signals (e.g. 20 Hz-20 KHz signals) for driving a speaker load. The speaker load value typically varies from 4 ohm to 32 ohm. Audio amplifiers may be used to drive loudspeakers, but may also be used for driving other types of speaker loads such as audio headphones and earpieces. Traditionally, audio amplifiers are class AB amplifiers. However, other types of amplifiers, such as class D amplifiers, may also be employed.

BRIEF DESCRIPTION OF THE DRAWINGS

Non-limiting and non-exhaustive embodiments of the present invention are described with reference to the following drawings, in which.

DETAILED DESCRIPTION

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar junction transistor (BJT) may be employed as an embodiment of a transistor, the scope of the words "gate", "drain", and "source" includes "base", "collector", and "emitter", respectively, and vice versa.

Briefly stated, the invention is related to a circuit for TDMA noise reduction. The circuit includes a first audio amplifier, a second audio amplifier, and a switch. The circuit is attachable to a stereo headphone with two speakers, each speaker having two inputs. The first speaker has one input that is coupled to one input of the second speaker. The other input of each speaker is coupled to a corresponding audio amplifier. During a talk mode for the mobile phone, the common input of the two speakers is left floating. In this mode, the TDMA noise is substantially cancelled, and the sound is differential monophonic. When the mobile phone is not in a talk mode, the common input of the speakers is driven to Vdd/2 or ground, so that the sound is stereophonic.

Figure 1:
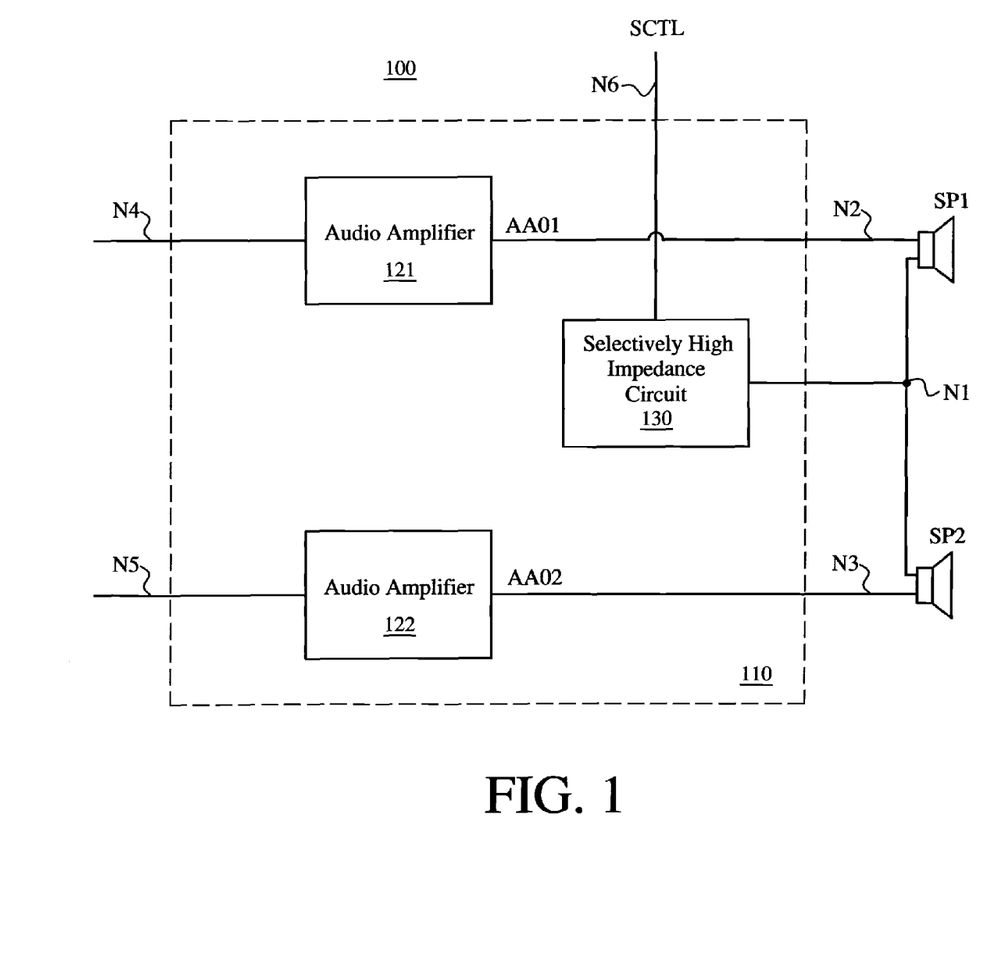
FIG. 1 shows a block diagram of an embodiment of a circuit.

FIG. 1 shows a block diagram of an embodiment of circuit 100. Circuit 100 may include speaker SP1, speaker SP2, and audio amplification circuit 110. Audio amplification circuit 110 includes audio amplifier 121, audio amplifier 122, and selectively high impedance circuit 130.

Speaker SP1 has an input that is coupled to node N1 and another input that is coupled to node N2, so that speaker SP1 has a differential speaker input with a first half of the differential input provided at node N2 and a second half of the differential input provided at node N1. Speaker SP2 has an input that is coupled to node N1 and another input that is coupled to node N3, so that speaker SP1 has a differential speaker input with a first half of the differential input provided at node N3 and a second half of the differential input provided at node N1. Audio amplifier 121 has an input that is coupled to node N4 and an output that is coupled to node N2. Audio amplifier 122 has an input that is coupled to node N5 and an output that is coupled to node N3. Selectively high impedance circuit 130 has a control input that is coupled to node N6 and an output that is coupled to node N1.

Audio amplifier 121 is arranged to amplify an audio input signal received at node N4 to provide audio amplifier output signal AAO1 at node N2. Similarly, audio amplifier 122 is arranged to amplify an audio input signal received at node N5 to provide audio amplifier output signal AAO2 at node N3.

Further, selectively high impedance circuit 130 is arranged to provide a high impedance at node N1 if signal SCTL is asserted, such that node N1 is floating when signal SCTL is asserted. Conversely, node N1 is not floating when signal SCTL is not asserted, and is instead driven to a relatively fixed voltage if signal SCTL is unasserted. In one embodiment, selectively high impedance circuit 130 is a switch that is open if signal SCTL is asserted, and closed if signal SCTL is not asserted. In another embodiment, selectively high impedance circuit 130 is a tri-state driver that is tri-stated if signal SCTL is asserted, and not tri-stated if signal SCTL is not asserted.

Circuit 100 is arranged in an output-capacitor-less (OCL) configuration, in which no capacitor is needed to couple signal AAO1 to speaker SP1, and no capacitor is needed to couple signal AAO2 to speaker SP2.

Figure 2:
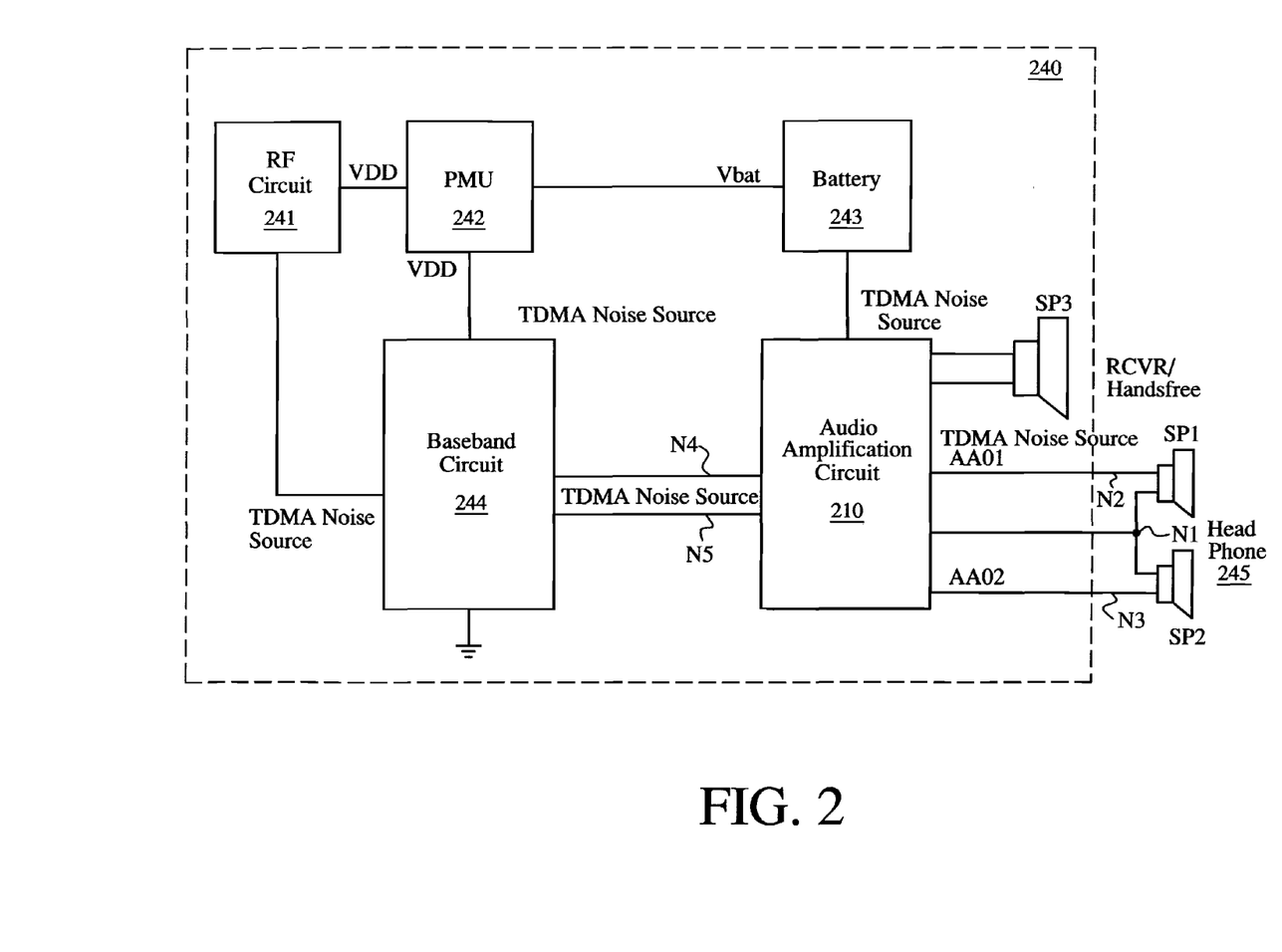
FIG. 2 illustrates a block diagram of an embodiment of a mobile phone and attached headphone, where the circuitry of FIG. 2 includes an embodiment of the circuit of FIG. 1.

FIG. 2 illustrates a block diagram of an embodiment of mobile phone 240 and attached headphone 245. Headphone 245 includes speaker SP1 and speaker SP2. Mobile phone 240 includes radiofrequency (RF) circuit 241, power management unit (PMU) 242, battery 243, baseband circuit 244, and audio amplification circuit 210. Audio amplification circuit 210, speaker SP1, and speaker SP2 together are an embodiment of circuit 100 of FIG. 1.

Battery 243 provides battery voltage Vbatt, and PMU 242 provides voltage VDD from Vbatt. RF circuit 241 may include an RF amplifier and a plurality of transceivers (not shown) that send and receive radio signals via an antenna or the like. The RF amplifier may be used to amplify RF signal, and to provide received amplified RF signals to baseband circuit 244. Baseband circuit 244 may perform functions such as modulation, de-modulation, encoding, and decoding. Further, baseband circuit 244 may include a de-modulation circuit and a de-coding circuit, and the de-coding circuit may include a digital-to-analog converter (DAC) (not shown).

Mobile phone 240 is configured for communication using GSM, or another communication protocol that uses TMDA. When voice communication is not currently occurring but the phone is connected to a cellular network, RF circuit 241 is in a receiving mode. When voice communication is not occurring, signal SCTL is not asserted, so that headphones 245 may provide a stereophonic sound. For example, mobile phone 240 may have an FM antenna, or may include stored music such as mp3 files or other suitable music format. By asserting SCTL and driving node N1, such music may be listened to in stereo. While listening to music rather than talking on the phone, since no TDMA de-modulation is occurring, no TDMA noise occurs.

When incoming radio waves with voice data are received, the signals are amplified, and they are de-modulated by baseband circuit 244. Further, the radio waves may have a carrier frequency of about 850 MHz to about 1.9 GHz, but the de-modulated signal has a frequency of 217 Hz. The de-modulation sinks significant current from the battery, causing the battery voltage to drop to a lower voltage level at a rate of 217 times per second. This is a significant voltage ripple that also causes a corresponding voltage ripple in voltage VDD (although the voltage ripple is much lesser in magnitude than the voltage ripple in Vbatt). This ripple in Vbatt and VDD causes "TDMA noise".

During talk mode, signal SCTL is asserted, so that node N1 is floating. This way, during talk mode, TDMA is reduced by differential canceling of the TDMA noise, as explained in greater detail below.

Figure 3A:
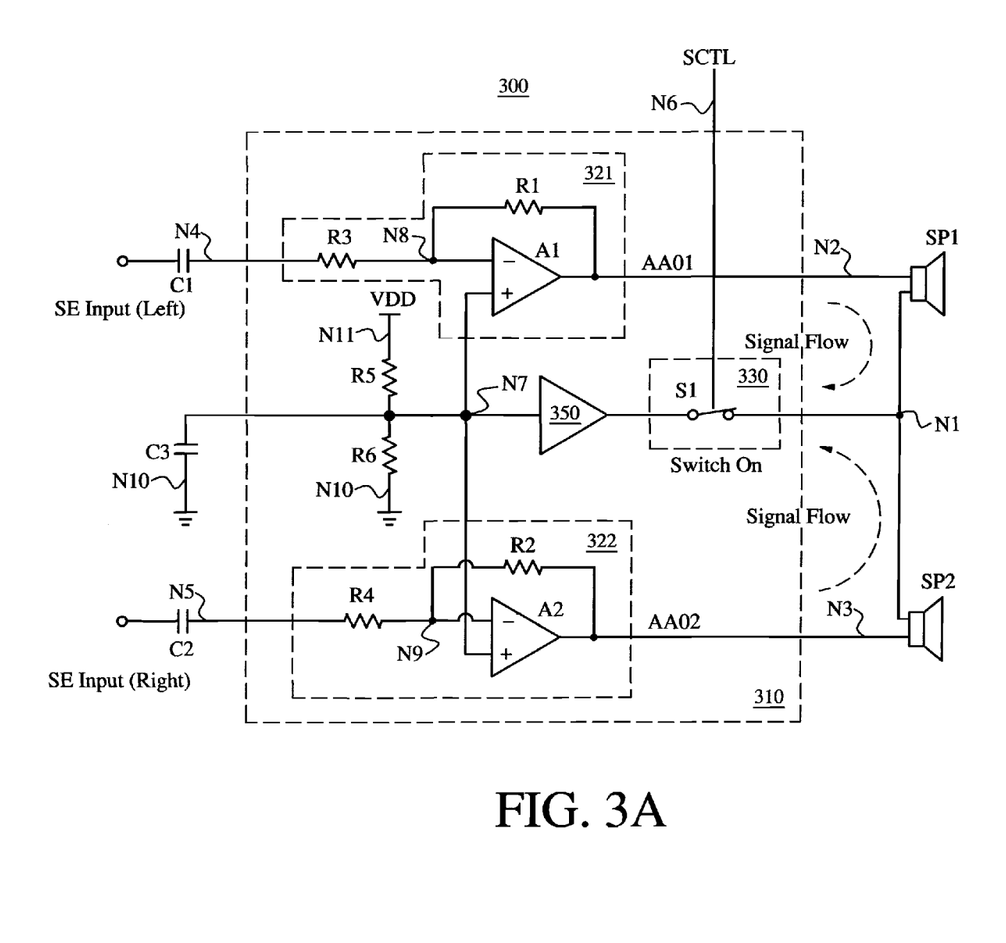
FIG. 3A shows a block diagram of an embodiment of the circuit of FIG. 1.

FIG. 3A shows a block diagram of an embodiment of the circuit 300, which is an embodiment of circuit 100 of FIG. 1. Circuit 300 further includes capacitors C1-C3. Audio amplification circuit 310 further includes driver 350, resistor R5, and resistor R6. Audio amplifier 121 includes resistor R1, resistor R3, and op amp A1. Audio amplifier 322 includes resistor R2, resistor R4, and op amp A2. Selectively high impedance circuit 330 includes switch S1. FIG. 3A shows circuit 300 with switch S1 closed.

Resistors R5 and R6 are arranged as a voltage divider that provides a voltage of Vdd/2 at node N7. Further, driver 350 drives node N1 to Vdd/2.

As shown in FIG. 3A, because talk mode is not occurring, signal SCTL is not asserted so that switch S1 is closed. This enables stereo sound, and so the audio input signal is provided as a single-ended (Left) input that is capacitively coupled (via capacitor C1) to node N4, and a single-ended (Right) input that is capacitively coupled (via capacitor C2) to node N5. Because each of the speakers SP1 and SP2 is referenced to a fixed value, each speaker can provide a signal independent of the other, allowing stereo sound. As shown in FIG. 3A, there is signal flow at node N1 and current has a path to return to ground.

Figure 3B:
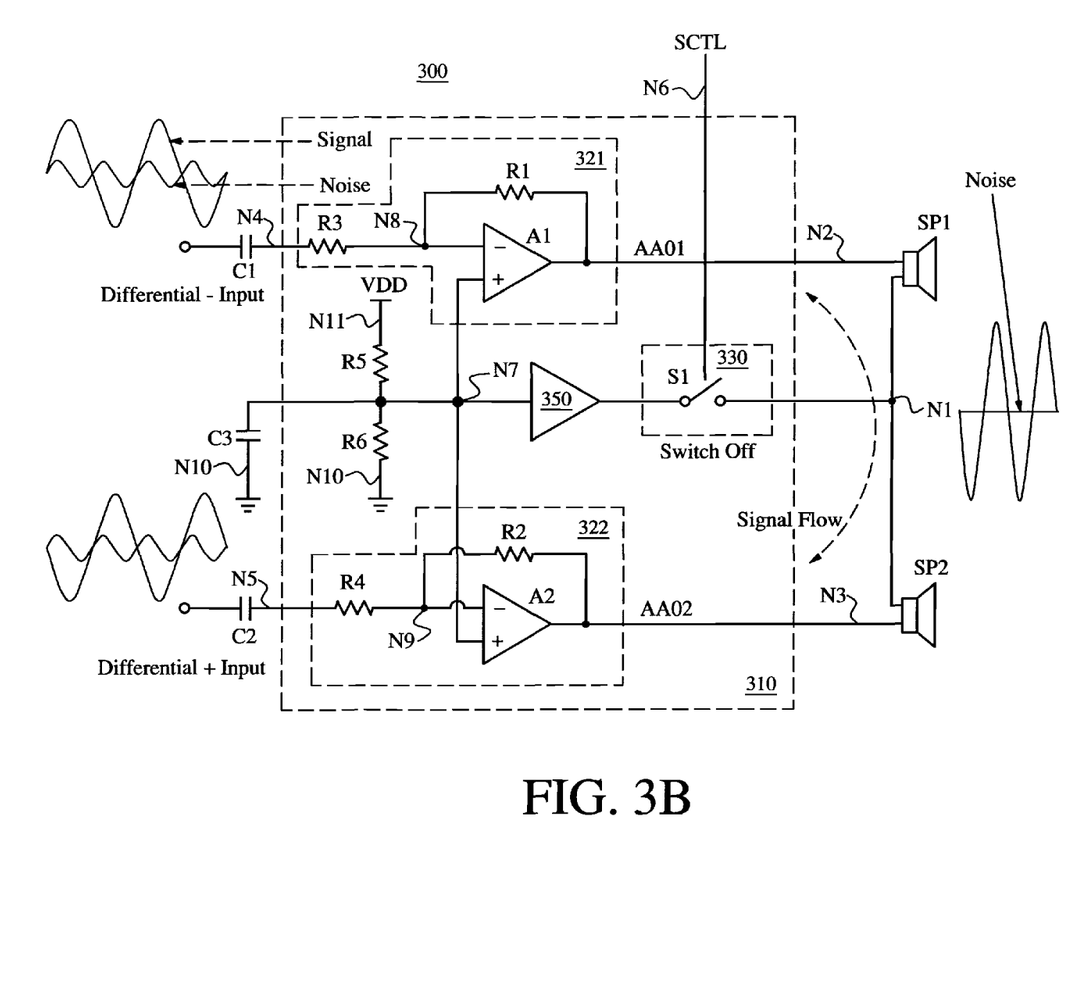
FIG. 3B shows a block diagram of an embodiment of the circuit of FIG. 3A with the switch open.

FIG. 3B shows a block diagram of an embodiment of circuit 300 in which switch S1 is open.

As shown in FIG. 3B, because talk mode is occurring, signal SCTL is asserted so that switch S1 is open. Also, the audio input signal is provided as a differential signal, with one half of the differential audio input signal capacitively coupled to node N4, and the other half of the differential audio input signal capacitively coupled to node N5. The sounds output by speakers SP1 and SP2 is a differential monophonic sound. The differential input − audio input signal and the differential input + audio input signal each have a TDMA noise component. Further, the differential − input signal, and the differential + input signal, ignoring the noise component, are 180 degrees out-of-phase with each other. However, the TDMA noise components are in phase with each other. There is no current flow from node N1 to ground with switch S1 open. Because the TDMA noise components are in phase with each other, the TDMA noise is differentially cancelled. By using this configuration, noise may be substantially reduced, particularly TDMA noise and white noise.

Although FIGS. 3A and 3B show a switch S1, in other embodiments, driver 350 and switch S1 may be replaced with a tri-state driver. In this embodiment, the driver is tri-stated for the mode shown in FIG. 3B, and is not tri-stated in the mode shown in FIG. 3A.

Figure 4:
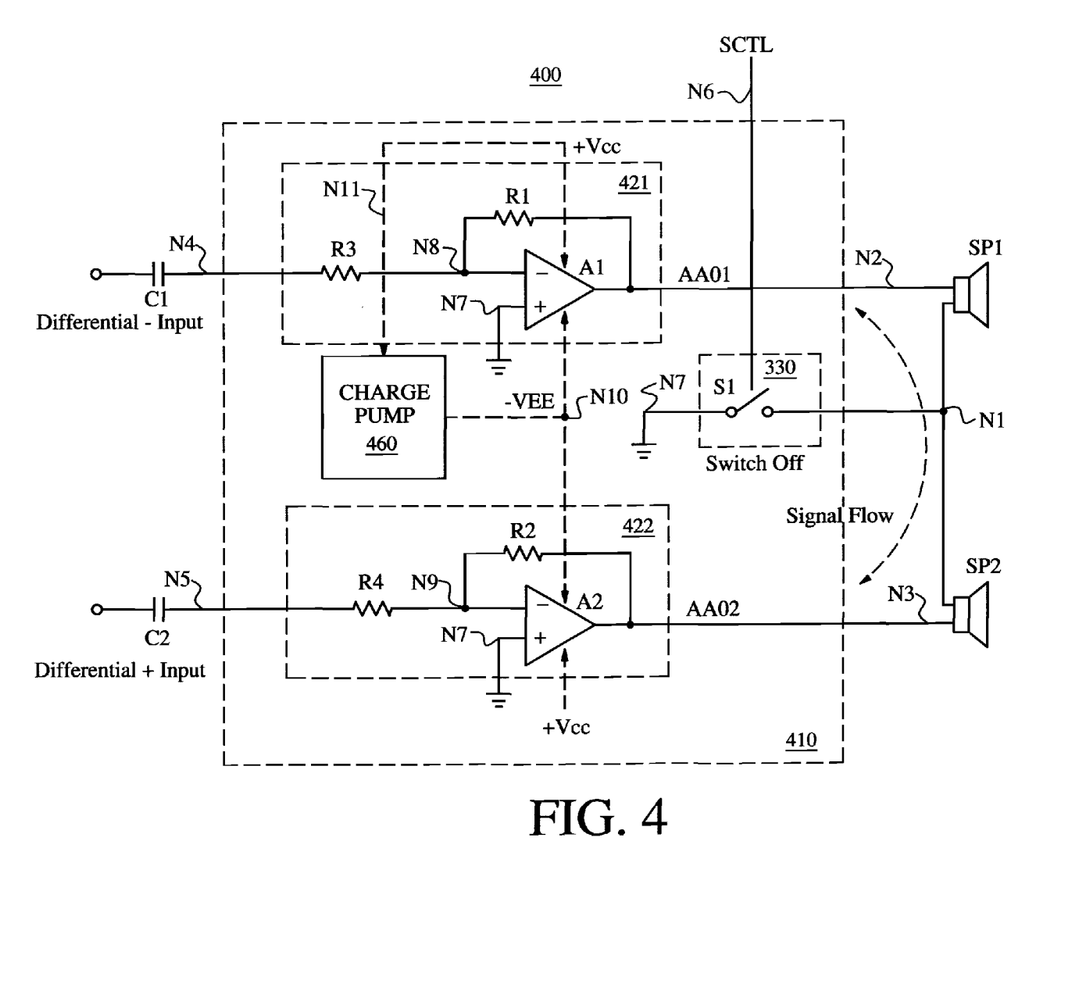
FIG. 4 illustrates a block diagram of an embodiment of the circuit of FIG. #B that has a dual supply, arranged in accordance with aspects of the present invention.

FIG. 4 illustrates a block diagram of an embodiment of the circuit 400, which may be employed as an embodiment of FIG. 3B that has a dual supply, rather than a single supply as shown in the embodiment illustrated in FIG. 3B. Audio amplification circuit 410 further includes charge pump 460.

Charge pump 460 is arranged to provide voltage −VEE from voltage +VCC. Because of the dual supply, the voltage at node N7 is ground rather than Vdd/2. In this embodiment, when switch S1 is closed, node N1 is driven to ground rather than Vdd/2.

The above specification, examples and data provide a description of the manufacture and use of the composition of the invention. Since many embodiments of the invention can be made without departing from the spirit and scope of the invention, the invention also resides in the claims hereinafter appended.

What is claimed as new and desired to be protected by Letters Patent of the United States is:

1. A circuit for noise reduction, comprising:
   a first speaker having a first input and a second input, wherein the first input of the first speaker is coupled to a first node;
   a second speaker having a first input and a second input, wherein the first input of the second speaker is coupled to the first node; and
   an audio amplification circuit that is arranged in an output-capacitor-less (OCL) configuration, wherein the audio amplification circuit includes:
   a first audio amplifier having at least a first output that is connected to the second input of the first speaker;
   a second audio amplifier having at least a first output that is connected to the second input of the second speaker; and
   a selectively high impedance circuit that is coupled to the first node, wherein the selectively high impedance circuit is arranged in a configuration such that the first node is floating.

2. The circuit of claim 1, wherein the first audio amplifier has at least a first input that is arranged to receive a capacitively-coupled first half of a differential audio input signal, the second audio amplifier has at least a first input that is arranged to received a capacitively-coupled second half of the differential audio input signal, the first half of the differential audio input signal is out of phase with the second half of the second half of the differential audio input signal, the first half and second half of the differential audio input signal each include Time Division Multiple Access (TDMA) noise, and wherein the first speaker and the second speaker together a differential monophonic sound in which the TDMA noise is substantially cancelled.

3. The circuit of claim 1, wherein
the selectively high impedance circuit is at least one of a switch or a tri-state driver.

4. The first of claim 1, wherein
the selectively high impedance circuit is coupled between a second node and the first node;
the first audio amplifier further has at least a first input that is arranged to receive a first audio input signal, and a second input that is coupled to the second node; and
wherein the second audio amplifier further has at least a first input that is arranged to receive a second audio input signal, and a second input that is coupled to the second node.

5. The circuit of claim 4, wherein
the selectively high-impedance circuit is a switch, and
wherein the audio amplification circuit further includes a driver that is coupled between the second node and the switch.

6. The circuit of claim 4, wherein
the selectively high impedance circuit is a tri-state driver.

7. An apparatus for noise reduction, comprising:
a GSM mobile phone, including:
  a plurality of transceivers that are arranged to send and receive radio signal encoded with voice data, wherein the encoding includes Time Division Multiple Access (TDMA);
  a de-modulation circuit that is arranged to de-modulate received radio signal to provide a de-modulated signal during a talk mode, such that TDMA noise occurs during the talk mode;
  a decoding circuit that is arranged to provide an audio input signal from the de-modulated signal during the talk mode; and
  an audio amplification circuit that is arranged to receive the audio input signal, wherein the audio amplification circuit includes:
    a first audio amplifier having at least a first output;
    a second audio amplifier having at least a first output; and
    a selectively high impedance circuit that is coupled to a first node, wherein the audio amplification circuit is arranged to provide a first differential speaker input to a first speaker of a set of stereophonic speakers such that a first half of the first differential speaker input is provided at the first output of the first audio amplifier, and such that a second half of the first differential speaker input is coupled to the first node; wherein the audio amplification circuit is arranged to provide a second differential speaker input to a second speaker in the set of stereo speakers such that a first half of the second differential speaker input is provided at the first output of the second audio amplifier, and such that the second half of the second differential speaker input is coupled to the first node; and wherein the selectively high impedance circuit is arranged in a configuration such that the first node is floating during the talk mode, and such that the first node is not floating during a stereo mode, such that first and second differential speaker inputs provide differential monophonic sound during the talk mode, and such that first and second differential speakers inputs provide stereophonic sound during the stereo mode.

8. The apparatus of claim 7, wherein
the selectively high impedance circuit is arranged to provide a current return path from the first node to ground during the stereo node, and arranged such that there is no current return path from the first node to ground during the talk mode.

9. The apparatus of claim 7, further comprising:
a driver having at least an input and an output, wherein the input of the driver is arranged to receive a relatively fixed voltage, the selectively high impedance circuit is a switch that is arranged to be open during the talk mode and closed during the stereo mode, and wherein the switch is coupled between the output of the driver and the first node.

10. The apparatus of claim 7, wherein
the selectively high impedance circuit is a tri-state driver having an input that is arranged to receive a relatively fixed voltage, and an output that is coupled to the first node, wherein the tri-state driver circuit is arranged to tri-state during the talk mode, and arranged to drive the first node during the stereo mode.

11. The apparatus of claim 7, wherein
the first audio amplifier has at least a first input;
the second audio amplifier has at least a first input;
during the stereo mode: the baseband circuit is arranged to provide a first single-ended audio signal to the first input of the first audio amplifier, and to provide a second single-ended audio signal to the first input of the second audio amplifier; and
wherein during the talk mode: the baseband circuit is arranged to provide a first half of a differential audio input signal to the first input of the first audio amplifier, the baseband circuit is arranged to provide a second half of the differential audio input signal to the first input of the second audio amplifier, the first half of the differential audio input signal is out of phase with the second half of the second half of the differential audio input signal, the first half and second half of the differential audio input signal each include Time Division Multiple Access (TDMA) noise, and wherein the first speaker and the second speaker together provide a differential monophonic sound in which the TDMA noise is substantially cancelled.

12. A method for noise reduction, comprising:
amplifying a first audio input signal to provide a first audio amplifier output signal;
amplifying a second audio input signal to provide a second audio amplifier output signal;
coupling the first audio amplifier output signal to the first input of a first speaker;
coupling the second audio amplifier output signal to the first input of a second speaker; and
during at least one operating mode, causing a second input of the first speaker and a second input of the second speaker to float, wherein the second input of the first speaker is connected to a first node, and wherein the second input of the second speaker is coupled to the first node.

13. The method of claim 12, wherein the at least one operating mode includes a talk mode of a GSM mobile phone.

14. The method of claim 12, further comprising driving the first node to a relatively fixed voltage during a stereo mode.

15. The method of claim 14, wherein the relatively fixed voltage is ground or VDD/2.

16. The method of claim 14, further comprising:
during the stereo mode:
providing the first audio input signal as a single-ended audio signal; and
providing the second audio input signal as another single-ended audio signal, wherein the first and second speaker together provide a stereophonic sound, and wherein the at least one operating mode includes a talk mode of a GSM mobile phone; and
during the talk mode:
providing the first audio input signal as a first half of a differential audio signal; and
providing the second audio input signal as a second half of the differential audio signal, wherein the first half of the differential audio input signal is out of phase with the second half of the second half of the differential audio input signal, the first half and second half of the differential audio input signal each include Time Division Multiple Access (TDMA) noise, and wherein the first speaker and the second speaker together provide a differential monophonic sound in which the TDMA noise is substantially cancelled.

* * * * *

UNITED STATES PATENT AND TRADEMARK OFFICE
CERTIFICATE OF CORRECTION

| | | |
|---|---|---|
| PATENT NO. | : 7,822,400 B1 | Page 1 of 1 |
| APPLICATION NO. | : 11/924509 | |
| DATED | : October 26, 2010 | |
| INVENTOR(S) | : Hwang Soo Son | |

It is certified that error appears in the above-identified patent and that said Letters Patent is hereby corrected as shown below:

On the first page, in field (56), in column 2, under "Other Publications", line 1, delete "Steroe" and insert -- Stereo --, therefor.

On the first page, in field (56), in column 2, under "Other Publications", line 3, delete "LM4946," and insert -- LM4946 --, therefor.

On the first page, in field (56), in column 2, under "Other Publications", line 3-4, delete "programmable" and insert -- Programmable --, therefor.

In column 5, line 17, in claim 4, delete "first" and insert -- circuit --, therefor.

Signed and Sealed this
Third Day of May, 2011

David J. Kappos
*Director of the United States Patent and Trademark Office*